Jan. 21, 1941.     E. G. MALPAS     2,229,578
PISTON RING
Filed Jan. 30, 1939
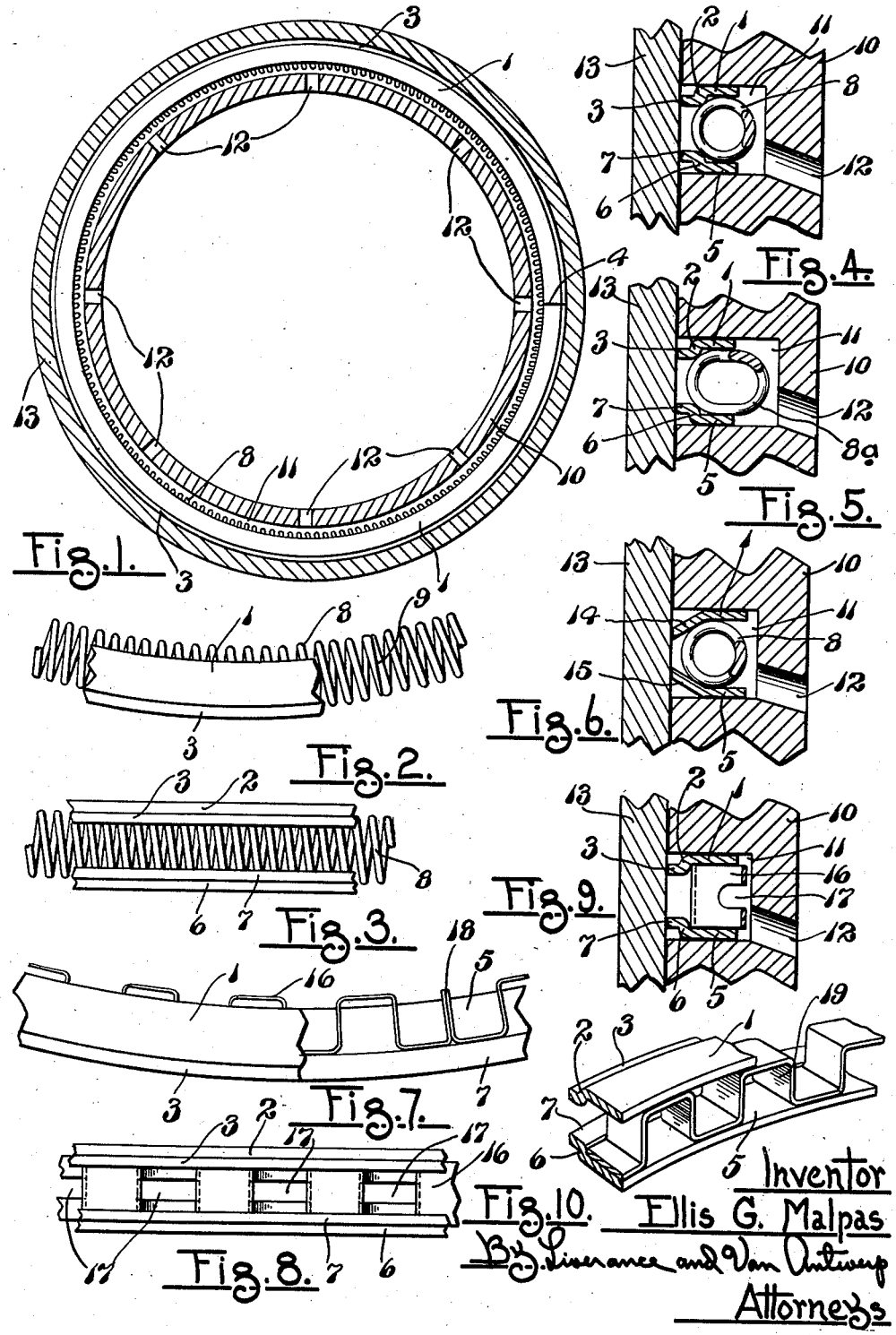
Inventor
Ellis G. Malpas
By Liverance and Van Antwerp
Attorneys Patented Jan. 21, 1941

2,229,578

UNITED STATES PATENT OFFICE 2,229,578

PISTON RING

Ellis G. Malpas, Muskegon, Mich., assignor to Sealed Power Corporation, Muskegon, Mich., a corporation of Michigan Application January 30, 1939, Serial No. 253,471

7 Claims. (Cl. 309—45)

The present invention is concerned with a piston ring structure particularly adapted for use in internal combustion engines. The constructions which embody my invention in general include upper and lower relatively thin ring members, the outer curved edges of which are in bearing engagement with the inner walls of a cylinder in which used, and such edge portions of the ring members are spaced apart a distance from each other, one of the ring members coming against the upper side of the ring groove of the piston in which installed and the other against the lower side. With my construction also a yielding spring member is used, to engage the thin ring members and normally tend to force or spread them outward to bear with pressure against the cylinder walls, and also to properly space them apart and hold them from fluttering or vibrating. With such a construction of piston ring a very economical ring is produced including a minimum of parts, and at the same time an "oil" ring is produced by means of which excess oil may be taken from the cylinder walls, carried through the ring and drained to the interior of the piston in which the ring is used and thence back to the crank case.

An understanding of the invention may be had from the following description, taken in connection with the accompanying drawing, in which:

Fig. 1 is a horizontal section through a cylinder and piston showing the piston ring of my invention in plan view.

Fig. 2 is a fragmentary plan view of a piston ring made in accordance with my invention.

Fig. 3 is a fragmentary elevation thereof, looking at the ring from its outer side.

Fig. 4 is a fragmentary vertical section taken through a piston and the adjacent cylinder at a ring groove in the piston, the ring in section being shown installed in the ring groove.

Fig. 5 is a view similar to Fig. 4, showing a slight modification in the ring structure.

Fig. 6 is a section similar to Figs. 4 and 5, illustrating a further slight modification.

Fig. 7 is a plan view of a piston ring in which the spacing and spreading spring member is of a different form than that shown in Figs. 1 to 6, inclusive.

Fig. 8 is a fragmentary elevation thereof.

Fig. 9 is a view similar to Figs. 4 to 6, inclusive, showing the piston ring disclosed in Figs. 7 and 8, and Fig. 10 is a fragmentary perspective view of a still further modification in ring structure.

Like reference characters refer to like parts in the different figures of the drawing.

The piston ring includes an upper ring member of thin material, usually steel, which is formed with a flat horizontal section 1 which, toward its outer edges is off-set downwardly as at 2 and then continued outwardly in a short horizontal lip 3. The ring member is radially parted at one side, as shown at 4 in Fig. 1. The other ring member is also of flat thin material, preferably steel, has a flat section 5, a similar annular off-set at 6 and a terminal horizontal lip 7. The two ring members are spaced from each other and between the inner flat sections 1 and 5 a spring spreader and spacer 8 is inserted. The member 8 is in the form of a continuous coiled helical spring, the coils being of circular form and the entire member being of a circular form so as to lie between the upper and lower ring members, holding them apart and pressing against the annular shoulders which are provided by the oppositely off-set annular portions 2 and 6 of the two ring members. The member 8 when it is properly assembled with the flat thin ring members, has its coils compressed together and the two ends of the coiled spring which makes the member 8, come together as at 9 in Fig. 2 whereby the member 8 is under a tension, the coils being compressed together, and through their normal tendency of separation exerting an outward radial force against the shoulders of the off-set annular sections 2 and 6 and, thus tending to press the ring members outwardly.

A piston ring as thus constructed may be installed in a piston, indicated at 10, in a lower ring groove 11 thereof. From the inner lower portions of the ring groove 11 a plurality of oil drainage passages 12 are made through to the interior of the piston, which is hollow. The piston being located within a cylinder 13 and the ring of the construction and assembly described located within the ring groove 11, the outer curved edges of the lips 3 and 7 have a bearing engagement against the inner walls of the cylinder, are held against such walls of the cylinder by a yielding spring pressure. Spaced apart from each other, excess oil scraped from the cylinder walls by said lips passes inwardly between the coils of the member 8 and is drained through the passages 12 to the interior of the piston from which it may go back to the engine crank case.

The construction illustrated in Fig. 4 is the same in every respect except that the coils of the member 8a which replaces the spacing and spreader member 8 in Figs. 1 to 4, inclusive, are not of circular form but are of a substantially oblong or oval shape. Such oblong coils, which are of greater length in the horizontal direction, provide more side contact between the coils of the member 8a and the inner flat sections 1 and 5 of the thin ring members and because of such greater contact provide some advantages over the lesser contact of the coils of the member 8 with the flat ring members. In Fig. 6, from the inner flat sections 1 and 5 of the thin ring members angular outwardly extending sections 14 and 15 are provided instead of the off-set shoulder portions 2 and 6 and the horizontal lips 3 and 7. It is equivalent in most respects with the structure shown in Figs. 1 to 4, inclusive, the outward pressure of the expander member 8 coming against the inner converging sides of the sections 14 and 15. Also the outer edges of the outer sections 14 and 15 are shaped so as to engage with a flat engagement against the inner walls of the cylinder 13 and therefore are at acute angles to the inner sides of the sections 14 and 15 and provide a sharper oil scraping action.

In Figs. 7, 8 and 9 the thin ring members are the same as in Figs. 1 to 5, inclusive. The spacing and spreading member which is used in place of the coil member 8 is shown at 16, and consists of a continuous length of thin flat ribbon stock which is bent into a connected series of U-shaped portions alternately opening inward and outward, as shown in Fig. 7. The inner U-shaped portions are horizontally slotted at 17. The ends of the member come together at 18 in Fig. 7 and when thus brought together the U-shaped portions are contracted and compressed, the tendency of the spring expander and spacing member being to enlarge circumferentially and thus a continuous pressure is produced against the shoulders provided by the annular off-sets 2 and 6 to press the outer edges of the lips 3 and 7 against the cylinder wall. The inner sides of the flat sections 1 and 5 have a considerable bearing engagement against the upper edges of the member 16, thus holding the ring members against fluttering or other undesired movement. The slots 17 provide openings for oil passage; and of course as the inwardly extending U-shaped portions of the member are located inwardly farther than the inner curved edges of the sections 5 of the ring member, space for oil passage is also there provided whereby excess oil taken from the inner walls of the cylinder is carried to the drainage passages at 12.

In Fig. 10 a modification in structure is made in that the spring spreading and spacing member at 19 has the alternate U-shaped portions thereof vertically instead of horizontally positioned, whereby the connecting portions between the legs of the U-shaped portions have a bearing against the inner sides of the sections 1 and 5 of the thin flat ring members. Such a spreading and spacing member inherently from its construction and assembly provides ample oil passage.

The radial pressure of the ring members against the cylinder wall may be governed by varying the length of the spreader and spacing member. The thin and flat ring members may also be made to have an inherent tension when closed at the parting at 4 which may be made more or less in accordance with the normal opening of the ring at the parting when it is free to open.

The construction described is of a very practical yet simple and economical character.

The invention is defined in the appended claims and is to be considered comprehensive of all forms of structure coming within their scope.

I claim:

1. A piston ring comprising, two spaced apart thin parted ring members of steel, the outer edge portions of said ring members being spaced shorter distances apart than the inner portions thereof and terminating in a substantially horizontal plane, and a spring spacing member located between the inner wider separated portions of the ring members and bearing against the narrower spaced outer portions thereof, said spacing and expanding member being compressed and thereby tending to enlarge circumferentially and exert an outward radial pressure upon the ring members whereby when in use, the outer curved edges of the ring members are pressed against the wall of a cylinder in which used.

2. A piston ring comprising, two spaced apart thin parted ring members, said ring members at their outer portions having continuous annular off-set sections extending toward each other, whereby the outer edges of said ring members are spaced shorter distances apart than the inner portions thereof and terminating in a substantially horizontal plane, a parted expander of spring material adapted to be circumferentially compressed and having the ends at the parting bear against each other whereby said compressed expander tends to enlarge circumferentially, said expander being located between the wider spaced apart portions of said ring members and engaging against the outer off-set portions thereof to exert an outward radial pressure thereagainst, said expanding and spacing member having openings in its length permitting oil passage therethrough.

3. A piston ring comprising, two spaced apart thin parted ring members having annular outer sections thereof extending toward each other for a short distance and then terminating in a short substantially horizontal portion, whereby the said horizontal portions are spaced a less distance apart than the inner portions thereof, and a coiled compression spring in annular form, with the ends thereof abutting, located between the inner wider spaced portions of said ring members, said coiled compression spring being normally of a greater length than the circumference of said ring member whereby the spring member is compressed when located between the ring members and tends to enlarge circumferentially and press against the outer annular off-set portions of the ring members, as and for the purposes specified.

4. A piston ring comprising, two spaced thin parted ring members having outer lip portions off-set in a direction toward each other for a short distance and then terminating in outwardly extending parallel portions, thereby providing annular shoulders opposite each other at the inner sides of said ring members, and a coiled spring member of a circular form having their ends abutting against each other located between the ring members and against said shoulders, said coiled spring member normally being of a greater length than the circumferential length of the ring members, whereby when located between the ring members it is compressed and exerts an outward radial pressure against said shoulders.

5. A piston ring comprising, two spaced thin parted ring members, having outer annular lip portions off-set in a direction toward each other for a short distance and then terminating in outwardly extending horizontal portions, thereby providing annular shoulders opposite each other at the inner side of said ring members, and a spring spacer member comprising a continuous length of flat spring material bent into alternate oppositely extended U-shaped sections, said spacer member being bent into a circular form and having ends brought together and located between the ring members and bearing against said shoulders, said spacer member when located between the ring members and against said shoulders being circumferentially compressed and thereby exerting an outward radial pressure against said shoulders, as and for the purposes specified.

6. A construction containing the elements in combination defined in claim 5, said spacer member being located between the ring members with said U-shaped sections thereof perpendicular to the planes of said ring members.

7. A construction containing the elements in combination defined in claim 5, said spacer being located between the ring members with the U-shaped sections thereof located in planes parallel to the planes of the ring members, and said spacer having openings for oil passage made therethrough in the bottoms of the inwardly extending U-shaped sections.

ELLIS G. MALPAS.